Aug. 4, 1964  L. H. HASKIN, JR  3,143,004
REVERSIBLE GEAR DRIVE
Filed Jan. 3, 1962  2 Sheets-Sheet 1

INVENTOR.
LAWRENCE H. HASKIN, JR.
BY
ATTORNEYS

INVENTOR.
LAWRENCE H. HASKIN, JR.
BY
ATTORNEYS.

United States Patent Office 3,143,004
Patented Aug. 4, 1964

3,143,004
REVERSIBLE GEAR DRIVE
Lawrence H. Haskin, Jr., Richmond, Va., assignor to The Inta-Roto Machine Company, Inc., Richmond, Va., a corporation of Virginia
Filed Jan. 3, 1962, Ser. No. 164,007
7 Claims. (Cl. 74—665)

This invention relates broadly to gearing and more particularly to readily reversible gear units for line shaft transmissions and the like.

The invention is particularly adaptable, although not limited, for use with web feeding roll mechanisms of printing machines and the like. In such mechanisms, a paper web or the like is frequently fed while in engagement with a plurality of rolls whose axes of rotation extend at right angles to a common power-operated line shaft. The web may pass over some of the rolls and under others and the arrangement in this respect may be varied. Each web engaging roll is driven from the common line shaft through a separate gear box unit embodying bevel gears.

The necessity frequently arises for reversing the direction of rotation of one or more of the web engaging rolls in the system, and to effect this reversal, it has been necessary in the prior art structures to dismantle one or more of the individual bevel gear box units and to remove the bevel pinion thereof and replace the same in a position for reverse operation in mesh with the bevel gear. In some instances, an entire gear box or boxes must be uncoupled from the line shaft and replaced by another gear box having the gears thereof set for the reverse operation of a particular web engaging roll. All of this is very time consuming and costly both as to labor and duplicate machinery and requires relatively long shut-downs of the entire machine.

Having in mind the defects of the prior art structures, it is the principal object of the present invention to provide a gear unit structure that may readily be reversed without dismantling or removal of parts of the gear unit.

It is a further object of the invention to provide a reversible gear unit having simplicity of design, economy of construction and efficiency in operation.

Briefly, according to the present invention, simplified means is provided to allow each or any gear box or unit of the system to be quickly reversed to effect the desired reversal of rotation of a particular web engaging roll without the necessity of dismantling the gear box or removing the same from the apparatus or disconnecting the gear box from the particular web engaging roll which it drives. Each gear box is so mounted on the apparatus and coupled to the line shaft that the entire gear box and the bevel pinion journaled thereon may be turned 180 degrees with respect to the line shaft and web engaging roll or other driven member to reverse the direction of rotation of the latter, without the necessity for changing the bevel gears or removing the gear unit.

Instead, it is merely necessary to temporarily uncouple the line shaft on opposite sides of the particular gear box to be reversed in the line shaft and to then turn the entire gear box and the shaft section carrying the bevel pinion 180 degrees on the axis of the web engaging roll and then recouple the unit in the line shaft. The gear box is rotatively mounted on the machine frame so that no lifting, removal or replacement of the box is required. This procedure facilitates reversing the direction of rotation of individual web engaging rolls in a very short time and with very little labor and without the removal or replacement of any parts in the system and no structural changes whatsoever are required.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1:
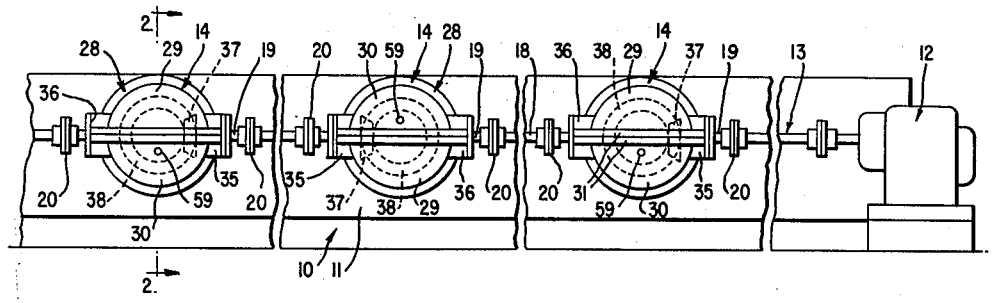
FIG. 1 is a fragmentary diagrammatic side elevation of an apparatus having a line shaft and a plurality of readily reversible gearing units according to the invention connected therein.

Referring to the drawings in greater detail, specifically to FIG. 1, an apparatus may comprise a fixed frame or support 10 including an upstanding side frame or wall 11, a power unit 12 adjacent one end of the wall 11, a horizontal sectional line shaft 13 coupled to the drive shaft of the power unit 12, and a plurality of gear units 14 operatively connected to the line shaft 13 for driving web engaging rolls or other instrumentalities. The foregoing organization is standard for apparatus of the type with which the present invention is concerned, and the invention itself resides in the individual gear units and their mounting on the frame wall 11 and coupling in the line shaft 13. Moreover, it should be understood that any desired number of these gear units may be included in a particular machine or system and the three units shown in FIG. 1 are illustrative only and should not be taken in a limiting sense. While the invention advantageously is applicable to a machine including a single gear unit, normally the machine will include a plurality of gear units.

The line shaft 13 is common to the several gear units 14 for driving the same in unison, and includes multiple sections 18 and 19 of which the sections 19 are journaled for rotation on the casing means of the respective gear units 14, and the sections 18 may be interposed between the sections 19 if the latter cannot be directly connected together due to the spacing of the gear units. Conventional separable line shaft couplings 20 are provided on opposite sides of each gear unit 14 for detachably coupling together the individual sections of the line shaft 13. The individual gear units 14 are all identical in construction and operation.

Figure 2:
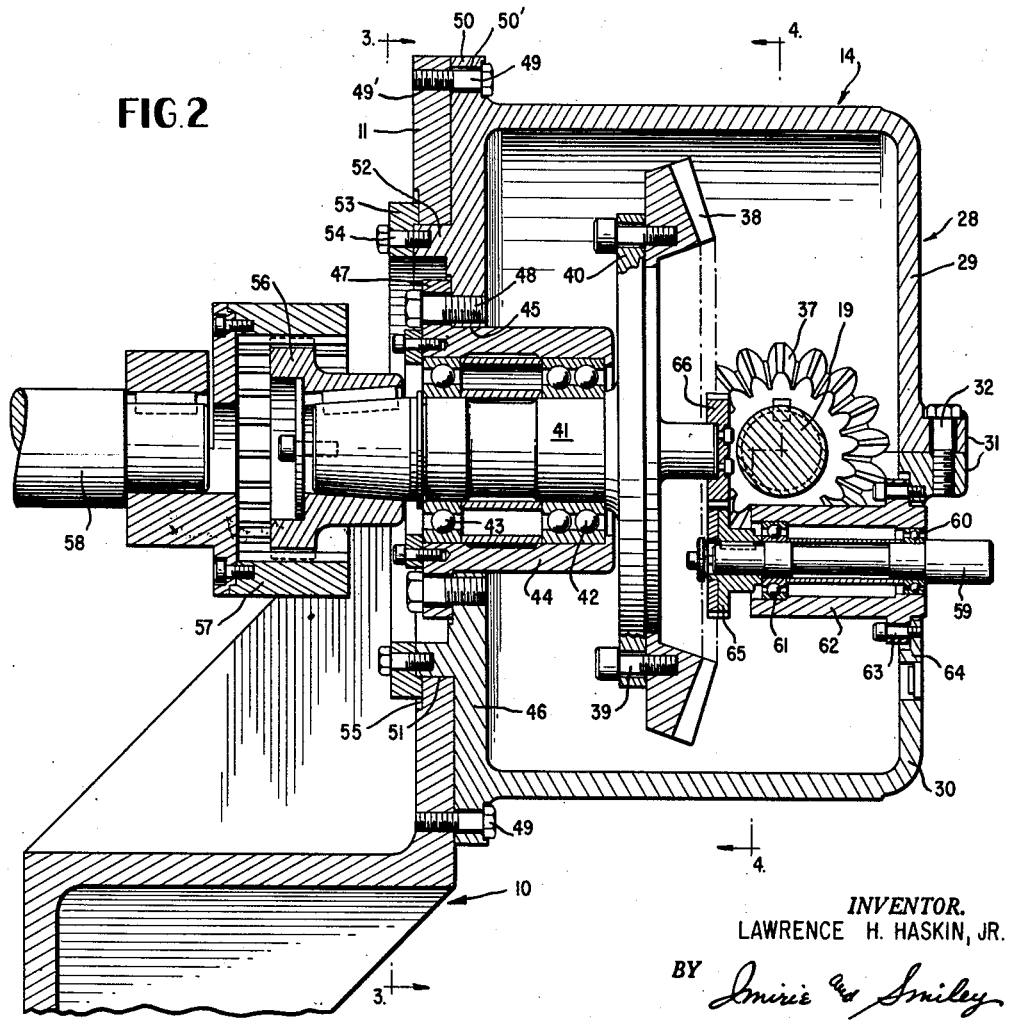
FIG. 2 is an enlarged fragmentary vertical section through one reversible gear unit taken on line 2—2 of FIG. 1.
Figure 3:
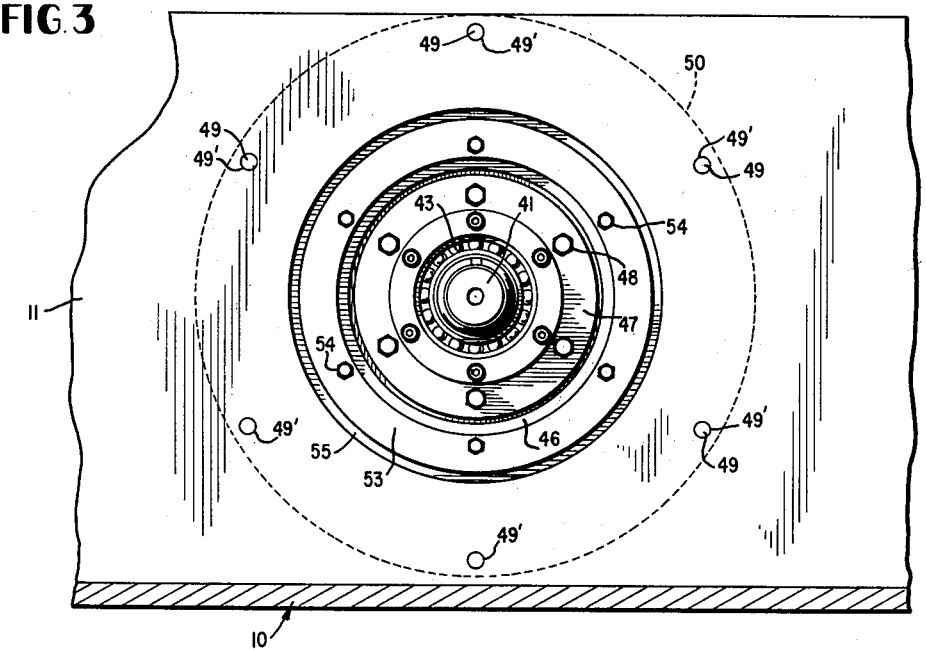
FIG. 3 is a transverse vertical section taken substantially on line 3—3 of FIG. 2.
Figure 4:
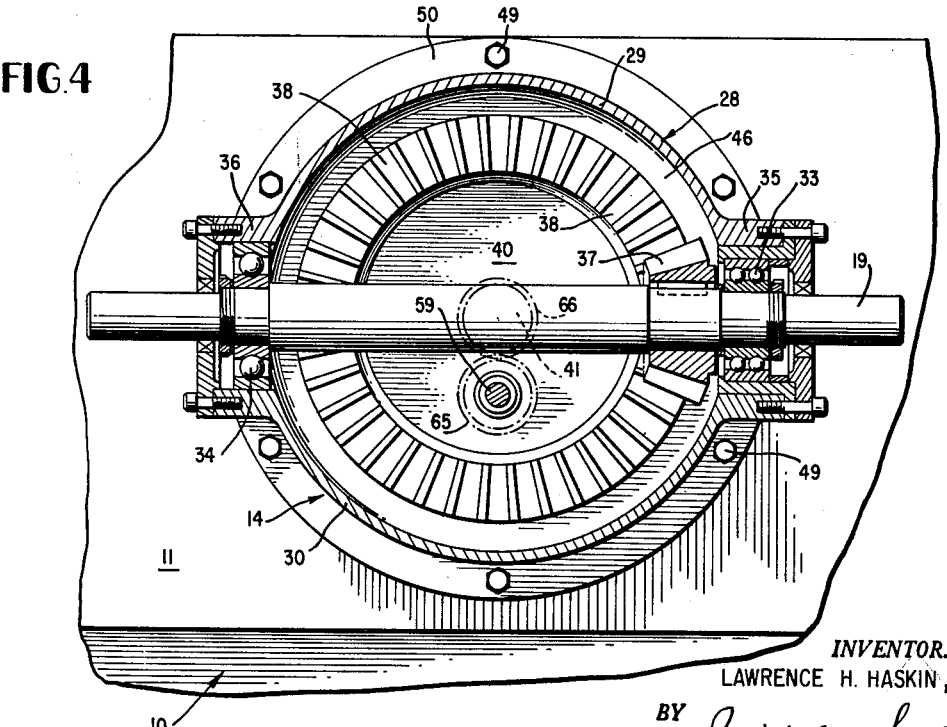
FIG. 4 is a similar section taken on line 4—4 of FIG. 2.

With reference to FIGS. 2–4, the gear unit 14 comprises a split or two-part substantially cylindrical gear case 28 whose axis extends at right angles to the line shaft 13 and which includes upper and lower casing sections 29 and 30 having meeting horizontal flanges 31 secured together by bolt means 32. The line shaft section 19 for the particular unit 14 extends diametrically through the case 28, FIG. 4, and the ends of the shaft section 19 are spaced equidistantly from the axial center of the case 28. The shaft section 19 is journaled for free rotation near its opposite ends on ball bearings 33 and 34, held by suitable retainer means within radial tubular bosses 35 and 36 formed integrally with the case 28 at diametrically opposite sides thereof. The line shaft section 19 and its bearings are spaced a substantial distance forwardly of the upstanding wall 11 and near the front vertical wall of the gear case 28, as best shown in FIG. 2.

Secured to the shaft section 19 to turn therewith adjacent the inner end of the ball bearing 33 is a relatively small bevel pinion 37, meshing constantly with a relatively large bevel gear 38 disposed axially of the case 28 and engaging the inner side of the pinion 37, FIG. 2. The bevel gear 38 is secured by bolt means 39 to a hub plate 40 of a stub shaft 41 extending at right angles to line shaft section 19 and concentrically disposed within the cylindrical case 28. The stub shaft 41 is journaled for rotation upon ball bearings 42 and 43, held within a tubular bearing housing 44, mounted within a central opening 45 in the vertical back wall 46 of the gear case 28. The bearing housing 44 has a rear annular flange 47, rigidly secured to the casing back wall 46 by bolt means 48, as shown. The outer face of back wall 46 is machined flat and abuts the front face of upstanding wall 11 in assembly and is detachably rigidly secured thereto by circumferentially spaced bolt or clamp means 49 engaging through openings 50' in an annular marginal flange 50 of back wall 46 and registering screw threaded openings 49' in the vertical wall 11 of fixed frame 10. The openings 49' and 50' are symmetrically positioned about the axis of the gear unit and relative to the line shaft axis.

Adjacent the gear unit 14, the vertical frame wall 11 has a relatively large cylindrical opening 51 formed therethrough receiving slidably and rotatably an annular positioning flange 52 formed integrally with the back wall 46 and projecting axially rearwardly thereof and concentric with the axis of bevel gear 38. An adapter or clamping ring 53 abuts the end face of annular flange 52 and is releasably secured thereto by circumferentially spaced bolt means 54. The outer marginal portion of the ring 53 bears against a machined face 55 on the back or inner surface of the frame wall 11, radially outwardly of the flange 52. The arrangement is such that the gear case 28 is securely clamped to the vertical frame wall 11 by the coaction of the adapter ring 53 and back wall 46, and the annular flange 52 assures that the gear case is concentrically and rotatably mounted within the opening 51 of the wall 11.

Rearwardly of the vertical wall 11 and close to the same, a male splined coupling element 56 is rigidly secured to the stub shaft 41 to turn therewith. The male coupling element 56 is received within a female coupling element 57 and has splined engagement therewith for driving the latter rotatably. The female coupling element 57 in turn is keyed to the shaft 58 which may be the shaft of a printing cylinder, web feeding roll or like rotary device which is driven by the gear unit 14 and whose direction of rotation it is desired to reverse at certain times. The shaft 58 is aligned axially with the stub shaft 41 and is disposed at right angles to the line shaft 13. Any number of the gear units thus mounted upon the vertical wall 11 of the frame 10 are adapted to be driven in unison by the common line shaft 13 and the direction of rotation of the shaft 58 of each or any of the gear units may be reversed at will without necessitating the dismantling of the gear unit or the removal of the same from the supporting wall 11.

In order to reverse the direction of rotation of the shaft 58 of any of the gear units 14, it is merely necessary to first disconnect the pair of line shaft couplings 20 upon opposite sides of the particular gear unit to thus release the line shaft section 19 of that unit from the remainder of the line shaft. The motor unit 12 is of course turned off at this time so that the line shaft 13 is at rest. The bolt means 49 which connect the gear case flange 50 to the vertical wall 11 are temporarily removed, and, if necessary, the bolt means 54 are merely loosened slightly to release the ring 53 and back wall 46 from clamping engagement with the fixed frame wall 11.

The entire gear unit may then be revolved by means of the annular flange 52 on the gear case 28 rotating within the cylindrical opening 51 so that the line shaft section 19 is turned end-for-end 180 degrees and again brought into axial alignment with the remainder of the line shaft 13. The pinion 37 merely rolls around the gear 38 and is then disposed at the diametrically opposite side of the same to effect the reverse rotation thereof and of the shaft 58. When the particular gear unit has "reversed," the line shaft couplings 20 are repositioned and connected, if necessary the bolt means 54 are tightened securely, and the bolt means 49 are replaced and tightened. The bolt receiving openings 49' and 50' being symmetrically positioned relative both to the axis of the line shaft 13 and the axis of the driven shaft 58 are in register when the line shaft section 19 is aligned in either of its two positions with the line shaft 13.

Thus, the entire system is instantly ready to again operate in the normal manner under the power of the motor unit 12, but with the particular shaft 58 of the particular gear unit reversed as to its rotation. The entire reversing operation is thus accomplished in very little time and with an absolute minimum of labor and without even the necessity for any special tools. The gear unit which is thus reversed does not have to be dismantled or removed from the line shaft, and there is no necessity for the mechanic to open the gear case 28 or reposition gears. The entire unit is merely uncoupled from the line shaft, turned 180 degrees upon its annular positioning or pilot flange 52 and then coupled back into the line shaft, as described, and the unit is then ready for operation to drive the shaft 58 in the reverse direction. No lifting, removal or replacement of the gear unit is required. In FIG. 1, the intermediately positioned gear unit 14 is shown diagrammatically as the particular gear unit which has been reversed according to the foregoing procedure, and it may be observed that the bevel pinion 37 is on the reverse or opposite side of the bevel gear 38 as compared to those of the adjacent gear units 14.

Again referring to FIGS. 2-4 showing a typical gear unit 14, each such unit may also include a short power take-off shaft 59 extending at right angles to the line shaft section 19 and by-passing the latter in offset parallel relation to the stub shaft 41. The power take-off shaft 59 is journaled for rotation in ball bearings 60 and 61, held within a tubular bearing housing 62 secured by bolt means 63 to the front vertical wall portion 64 of the gear case. At its inner or rear end, the power take-off shaft 59 has spur gear means 65 rigidly secured thereto for rotation therewith and meshing constantly with a spur gear 66 on the forward extremity of the stub shaft 41. Thus, rotation of the line shaft 19 and the resultant rotation of the stub shaft 41 causes the power take-off shaft 59 to be driven.

The power take-off shaft 59 projects forwardly of the gear case 28, FIG. 2, and is adapted to be coupled to a magnetic switch unit, not shown, and which unit may constitute a part of an electric eye control system for a printing machine or the like. The magnetic switch unit thus employed is bodily carried by the power take-off shaft 59 or gear unit casing 28, and is connected with the remainder of the electrical controls through flexible wiring, not shown. Hence, when the entire gear case 28 is turned 180 degrees to effect the previously-described reversal of the direction of rotation of the shaft 58, the power take-off shaft 59 is positioned above the line shaft 13 as shown diagrammatically at the intermediate gear unit 14 in FIG. 1, and the flexible wiring associated with the magnetic switch on the shaft 59 is sufficiently long and flexible to allow the necessary displacement of the shaft 59 and the associated magnetic switch when the gear casing 28 is turned 180 degrees upon its axis.

The power take-off shaft 59 may, if preferred, be utilized for driving some instrumentality other than the mentioned magnetic switch and the use of the shaft 59 for this purpose merely illustrates a feature of the mechanism for a particular type of printing machine to which the invention is applicable. If preferred, the power take-off shaft feature may be omitted entirely from the construction and the resulting structure without the power take-off shaft 59 may still serve in exactly the manner above described to effect the reversal of rotation of any rotating member coupled to the shaft 58. In this connection, it is emphasized again that the invention is not restricted to printing machinery or even to the broader category of web feeding machinery. The principle of the invention may obviously be applied in connection with numerous machines or systems embodying plural rotary devices driven from a common line shaft or the like and wherein it is desired at times to reverse the direction of rotation of one or more of said devices.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. Reversible gearing for plural rotary instrumentalities whose direction of rotation it is desired to change selectively comprising support plate means having a plurality of spaced pilot openings formed therethrough, a gear case abutting one face of the support plate means adjacent each pilot opening thereof and having a positioning flange engaging within the pilot opening rotatably, an adapter ring engageable with the opposite face of the support plate means and abutting the positioning flange, bolt means interconnecting said adapter ring and positioning flange and adjustable to allow said flange and case to rotate upon the support plate means and to lock the latter in selected rotated positions thereon, a shaft journaled upon each gear case axially of the adapter ring and flange and extending beyond said opposite face of the support plate means and coupled to one of said rotary instrumentalities, a line shaft section journaled upon each gear case substantially at right angles to said shaft and having ends projecting equidistantly beyond opposite sides of said case, a bevel gear on each line shaft section within each case, a coacting bevel gear on said shaft within each case and meshing with the first-named bevel gear, releasable coupling means for the ends of each line shaft section to releasably couple the same to adjacent ends of identical line shaft sections of identical gear cases on said support plate means, and means to turn said coupled line shaft sections in unison.

2. Gearing comprising an upstanding support plate having a plurality of spaced pilot openings formed therethrough, gear cases engaging one side of the support plate and including positioning flanges rotatable within said pilot openings, detachable clamp means connecting the gear cases to the support plate near the peripheries of said cases, adapter rings adjacent said pilot openings on the side of the support plate remote from said cases and abutting said positioning flanges, releasable means interconnecting said adapter rings and positioning flanges and serving when tightened to clamp the adapter rings and cases against opposite sides of the support plate and allowing said rings and cases to turn upon the support plate when loosened, a pair of bevel gears arranged in mesh within each case, a pair of shafts journaled upon each case for rotation and carrying the bevel gears and disposed substantially at right angles to each other and extending exteriorly of the cases, one of said shafts on each case being substantially normal to the support plate and the other shaft substantially parallel thereto and extending equidistantly beyond opposite sides of the case, and means to detachably couple the ends of said other shaft to each case to the ends of corresponding shafts of like cases on opposite sides thereof.

3. The combination according to claim 2 wherein said one shaft is removably journaled in each said gear case.

4. The combination according to claim 2 wherein said detachable clamp means comprises a plurality of bolts each being accessible from outside of said support and said casing.

5. A reversible gear unit comprising a stationary support plate member having a pilot opening formed therethrough, a gear case abutting one side of the plate member and having a positioning flange engaging rotatably within the pilot opening, an adapter element releasably secured to the positioning flange and abutting the other side of the support plate member and forming therewith and with said flange a swiveled connection between the support plate member and gear case so that the latter may be rotated upon the support plate member, a first shaft journaled upon the gear case axially of the positioning flange and adapter element and adapted for connection with a rotary instrumentality whose direction of rotation it is desired to reverse selectively, a relatively large bevel gear within said case and secured to the first shaft to turn therewith, a second shaft journaled upon said case substantially at right angles to the first shaft and having end portions extending equidistantly beyond opposite sides of the case and adapted to be coupled with a line shaft exteriorly of the case, and a relatively small bevel gear secured to the second shaft within the case and meshing with said large bevel gear, said second shaft and small bevel gear being swingable substantially 180 degrees around the axis of the first shaft and large bevel gear with said case to effect the reverse rotation of said instrumentality coupled to the first shaft, said swiveled connection allowing rotation of the case and said swinging of the second shaft without detachment of the case from said support plate member.

6. The invention as defined by claim 5, including detachable fastener means rigidly interconnecting said gear case and support plate member, said fastener means being disposed symmetrically relative to the axes of both said first and second shafts and operable to secure said gear case in either of its two positions.

7. The invention as defined by claim 5, including a power take-off shaft journaled upon said case in radially offset parallel relation to the first shaft and at right angles to the second shaft and spaced from one side thereof, and gearing operatively connecting said first shaft and power take-off shaft within the case.

References Cited in the file of this patent

UNITED STATES PATENTS

| | | |
|---|---|---|
| 1,371,322 | Mikaelson | Mar. 15, 1921 |
| 1,641,698 | Shaw | Sept. 6, 1927 |
| 1,781,275 | Dobson | Nov. 11, 1930 |
| 2,011,597 | Stout | Aug. 20, 1935 |
| 2,190,851 | Staege | Feb. 20, 1940 |
| 2,918,825 | Bade | Dec. 29, 1959 |

FOREIGN PATENTS

| | | |
|---|---|---|
| 406,702 | Germany | Dec. 2, 1924 |